(12) United States Patent
Clark

(10) Patent No.: US 11,544,985 B2
(45) Date of Patent: Jan. 3, 2023

(54) BANKNOTE IMAGING

(71) Applicant: Innovative Technology Limited, Oldham (GB)

(72) Inventor: Paul Clark, Oldham (GB)

(73) Assignee: Innovative Technology Limited, Oldham (GB)

( * ) Notice: Subject to any disclaimer, the term of this patent is extended or adjusted under 35 U.S.C. 154(b) by 493 days.

(21) Appl. No.: 16/577,595

(22) Filed: Sep. 20, 2019

(65) Prior Publication Data

US 2020/0111277 A1    Apr. 9, 2020

(30) Foreign Application Priority Data

Oct. 5, 2018  (GB) ..................................... 1816232

(51) Int. Cl.
    *G07D 7/1205*    (2016.01)
    *H04N 9/04*    (2006.01)
    (Continued)

(52) U.S. Cl.
    CPC ........... *G07D 7/1205* (2017.05); *G01N 21/17* (2013.01); *G07D 7/121* (2013.01); *G07D 7/128* (2013.01);
    (Continued)

(58) Field of Classification Search
    CPC ...... G07D 7/1205; G07D 7/121; G07D 7/128; G07D 7/205; G07D 2207/00;
    (Continued)

(56) References Cited

U.S. PATENT DOCUMENTS 8,446,470 B2 * 5/2013 Lu .................... H04N 9/04559
    348/148
8,600,145 B2 * 12/2013 Minin .................. G06K 9/6281
    382/140

(Continued)

FOREIGN PATENT DOCUMENTS

KR    101707218 B1 * 2/2017 ............... G07D 7/12

OTHER PUBLICATIONS

International Commission on Non-Ionizing Radiation Protection (ICNIRP), Infrared Radiation (780 nm-1 mm), obtained from https://www.icnirp.org/en/frequencies/infrared/index.html available from at least Oct. 7, 2014—see Wayback Machine Capture (Year: 2014).*

(Continued)

*Primary Examiner* — David P Porta
*Assistant Examiner* — Jeremy S Valentiner
(74) *Attorney, Agent, or Firm* — Woodard Emhardt Henry Reeves & Wagner LLP

(57) ABSTRACT

A method of obtaining a plurality of infrared images of a banknote that involves simultaneously illuminating the banknote with infrared light at a first wavelength and infrared light at a second wavelength, capturing an image of the banknote with an RGB camera, obtaining from both a first output channel signal and a second output channel signal of the RGB camera sensor where the intensity distribution of the infrared light at the first wavelength and the intensity distribution of the infrared light at the second wavelength uses a first calibration coefficient and a second calibration coefficient of the RGB camera sensor, producing separate infrared images of the banknote at the first wavelength and the second wavelength from the respective intensity distributions.

5 Claims, 5 Drawing Sheets

(51) Int. Cl.
  *G01N 21/17* (2006.01)
  *H04N 5/33* (2006.01)
  *G06T 3/40* (2006.01)
  *G07D 7/128* (2016.01)
  *G07D 7/121* (2016.01)
  *G07D 7/202* (2016.01)

(52) U.S. Cl.
  CPC ............. *G07D 7/205* (2013.01); *H04N 5/332* (2013.01); *H04N 9/0451* (2018.08); *H04N 9/04553* (2018.08); *G01N 2021/1772* (2013.01); *G01N 2021/1776* (2013.01); *G01N 2201/0627* (2013.01); *G06T 3/4015* (2013.01); *G07D 2207/00* (2013.01)

(58) Field of Classification Search
  CPC .. H04N 9/0451; H04N 9/04553; H04N 5/332; G01N 21/17; G01N 2021/1772; G01N 2021/1776; G01N 2201/0627; G06T 3/4015
  See application file for complete search history.

(56) References Cited

U.S. PATENT DOCUMENTS

| | | |
|---|---|---|
| 2004/0145726 A1 | 7/2004 | Csulits et al. |
| 2015/0213620 A1* | 7/2015 | Ikemoto ............... G07D 7/1205 348/131 |
| 2017/0180683 A1 | 6/2017 | Won et al. |
| 2017/0276543 A1* | 9/2017 | Bogaki .................. H04N 1/486 |

OTHER PUBLICATIONS

Mascarini et al., Leaf Area Index, Water Index, and Red : Far Red Ratio, May 2006, Journal of American Society of Horticultural Science, vol. 131, Iss. 3, p. 313 (Year: 2006).*

* cited by examiner

BANKNOTE IMAGING

BACKGROUND

The present invention relates generally to the acquisition of an image of a banknote, a security document, or the like. More specifically, the present invention relates to obtaining images of a banknote in the infrared region of the electromagnetic spectrum for the purpose of identification and verification of the authenticity and denomination of the banknote.

Many conventional banknote validation devices are known within the field of banknote characterisation and authentication. Typically, a banknote validator device will utilise an optical sensor arrangement to interrogate and obtain information relating to an inserted banknote. The optical sensor arrangement may include visible, infrared and ultraviolet light sources, and one or more image sensor to receive and record reflected, transmitted and/or fluoresced light from the banknote under investigation.

Because of advances in anti-forgery technology, some currency banknotes now include sophisticated inks that have different spectral characteristics over the range of the electromagnetic spectrum. For example, some current currency banknotes contain inks that exhibit absorption spectra which vary over the infrared sector of the electromagnetic spectrum. Consequently, it is desirable for the optical sensor arrangement of a banknote validator device to be configured so as to be able to resolve these different absorption spectra to enable the banknote validator device to correctly recognise banknotes with the infrared variable inks.

In order that the banknotes having this variable absorption spectra in the infrared region can be correctly identified, it is necessary to illuminate the banknote at more than one infrared wavelength, and this requires the provision of more than one infrared light source. Alternatively, a single incandescent infrared light source can be used. However, such a source has a variable output, is less reliable than an LED, and is more difficult to accurately control.

A problem arises when attempting to illuminate a banknote with, for example, two distinct wavelengths of infrared light, because the conventional RGB camera used in a typical banknote validator cannot resolve between the two infrared wavelengths at the same time. It would therefore be necessary to illuminate the banknote sequentially with the first infrared wavelength and then the second infrared wavelength. However, this solution leads to a further problem in that the overall illumination time and additional image acquisition time would require a reduction in the throughput speed of the banknote under investigation.

Another possible solution would be to introduce infrared filters into the optical sensor arrangement of the banknote validator. This solution is not desirable since it would necessarily lead to an unwanted increase in the overall cost of the optical sensor arrangement and may additionally require enlargement of the overall size of the optical sensor arrangement.

The present invention seeks to overcome the above described problems associated with conventional banknote validators.

SUMMARY

According to an aspect of the present invention there is provided a method of obtaining a plurality of infrared images of a banknote as defined in claim 1.

Preferably, the first calibration coefficient is defined as a ratio of the first output channel signal amplitude at the infrared light first wavelength to the second output channel signal amplitude at the infrared light first wavelength. The second calibration coefficient is defined as a ratio of the second output channel signal amplitude at the infrared light second wavelength to the first output channel signal amplitude at the infrared light second wavelength.

Preferably, the first output channel is the RGB camera sensor Red channel, and the second output channel is the RGB camera sensor Blue channel.

Preferably, the RGB camera sensor is a CMOS or CCD image sensor, and the sensor includes a Bayer filter matrix.

BRIEF DESCRIPTION OF THE DRAWINGS

An embodiment of the present invention will now be described, by way of example only, with reference to the accompanying schematic drawings, in which.

DETAILED DESCRIPTION

Figure 1:
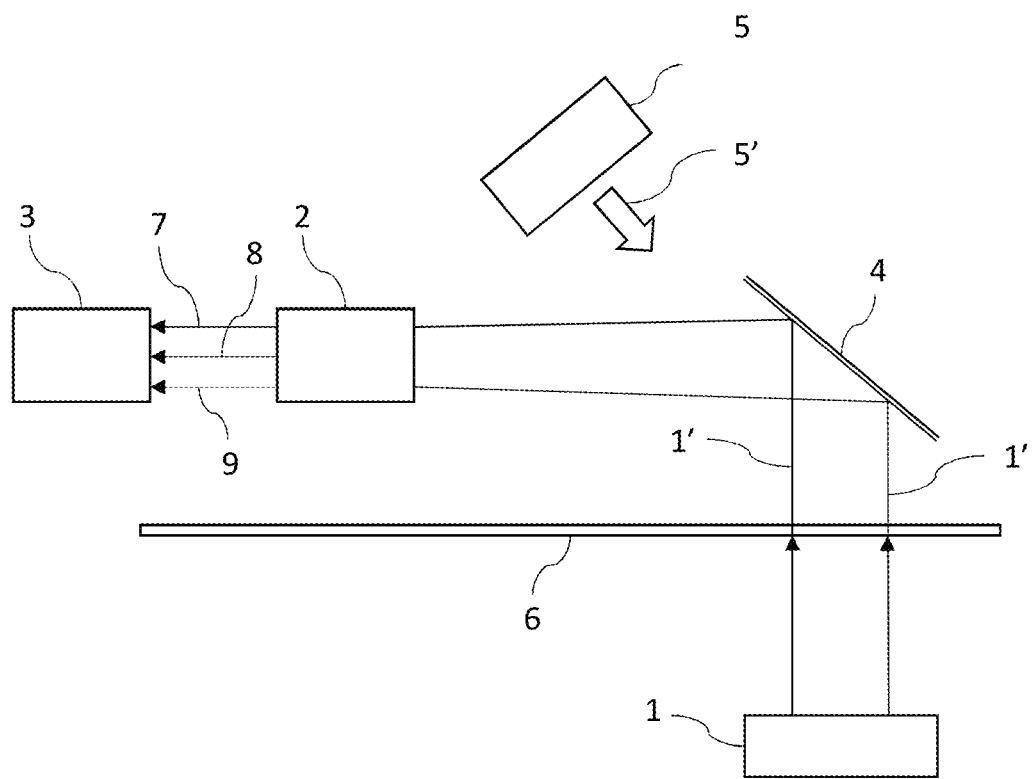
FIG. 1 shows a banknote validator optical arrangement configured for transmission mode.

As shown in FIG. 1, a banknote validator optical arrangement comprises a light source 1, an RGB camera 2 and a control unit 3. The banknote validator optical arrangement also includes an optional UV light source 5.

In transmission mode, as shown in FIG. 1, the light source 1 illuminates a banknote 6 from below. The light source 1 includes a plurality of LEDs [not shown]. One LED operates in the visible region of the electromagnetic spectrum, typically a white LED, a second LED emits infrared light at a first wavelength, and a third LED emits infrared light at a second wavelength.

In a preferred embodiment, the first wavelength is 730 nm, and the second wavelength is 880 nm. However, the reader will be aware that these wavelengths are examples only, and any wavelengths can be selected dependent upon the requirements of a given application.

Visible light and infrared light 1' passing through the banknote 6 under investigation is reflected by reflector element 4 towards the RGB camera 2.

The RGB camera 2 is a conventional digital camera comprising optics and a sensor [not shown]. The sensor is typically a CCD sensor or a CMOS sensor. In either case, the sensor will include a conventional Bayer filter matrix. The output of the sensor is directly connected to the control unit 3 via a red channel 7, a green channel 8, and blue channel 9 in a known manner. The control unit 3 includes a processor [not shown] including RGB control logic for receiving, processing and analysing the RGB data received from the RGB camera 2.

The optional UV light source 5, which includes at least one UV LED, illuminates the banknote with UV light 5' which excites fluorescence in the banknote 6. The fluorescent image data from the banknote 6 is collected by the RGB camera and passed to the control unit 3 for analysis.

In a preferred embodiment, three separate images of the banknote 6 are obtained in sequence: (i) image taken with white LED only on; (ii) image taken with infrared LEDs only on; and (iii) image taken with the UV LED only on.

Figure 2:
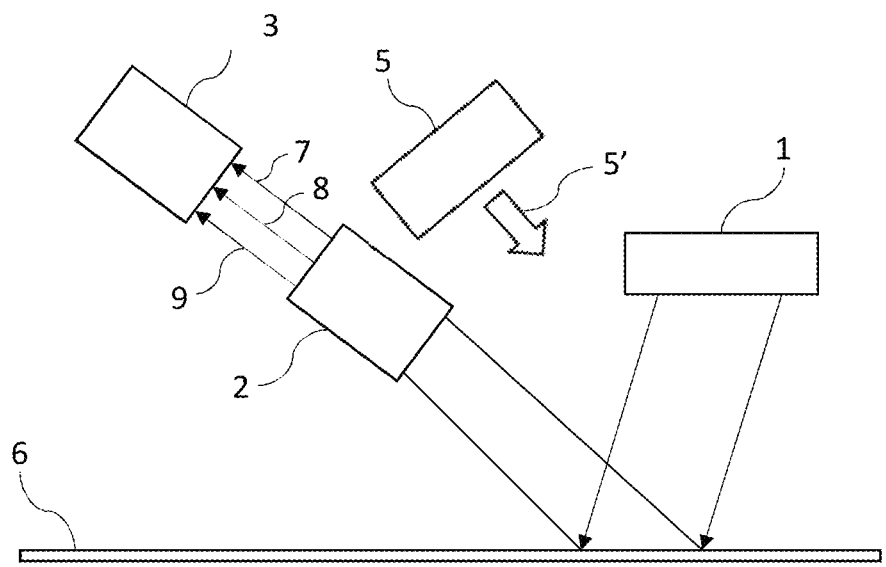
FIG. 2 shows the banknote validator optical arrangement configured for reflection mode.

In a similar manner to that which is described above, and as shown in FIG. 2, the banknote validator optical arrangement can be configured for operation in reflection mode. Here, the RGB camera 2 is positioned to directly collect images of the banknote 6 without requiring a reflector element 4. However, the skilled reader will be aware that the banknote validator optical arrangement can be configured in such a manner that it may operate simultaneously in both reflection and transmission modes with the inclusion of a suitable two-way reflector element 4.

As will be known to the skilled reader, a conventional Bayer filter matrix does not include any infrared filters. Consequently, to separate an infrared image from a visible image of a banknote it has been conventionally necessary to incorporate at least one infrared filter within the optical arrangement of the banknote validator. As noted above, this leads to a commensurately larger and more expensive optical arrangement.

Advantageously, it has been found that an image of a banknote undergoing illumination by infrared light at two differing wavelengths can be separated into two distinct images by manipulation of the relative differences in the efficiencies of the colour filters within the Bayer filter matrix of a conventional RGB camera.

Figure 3:
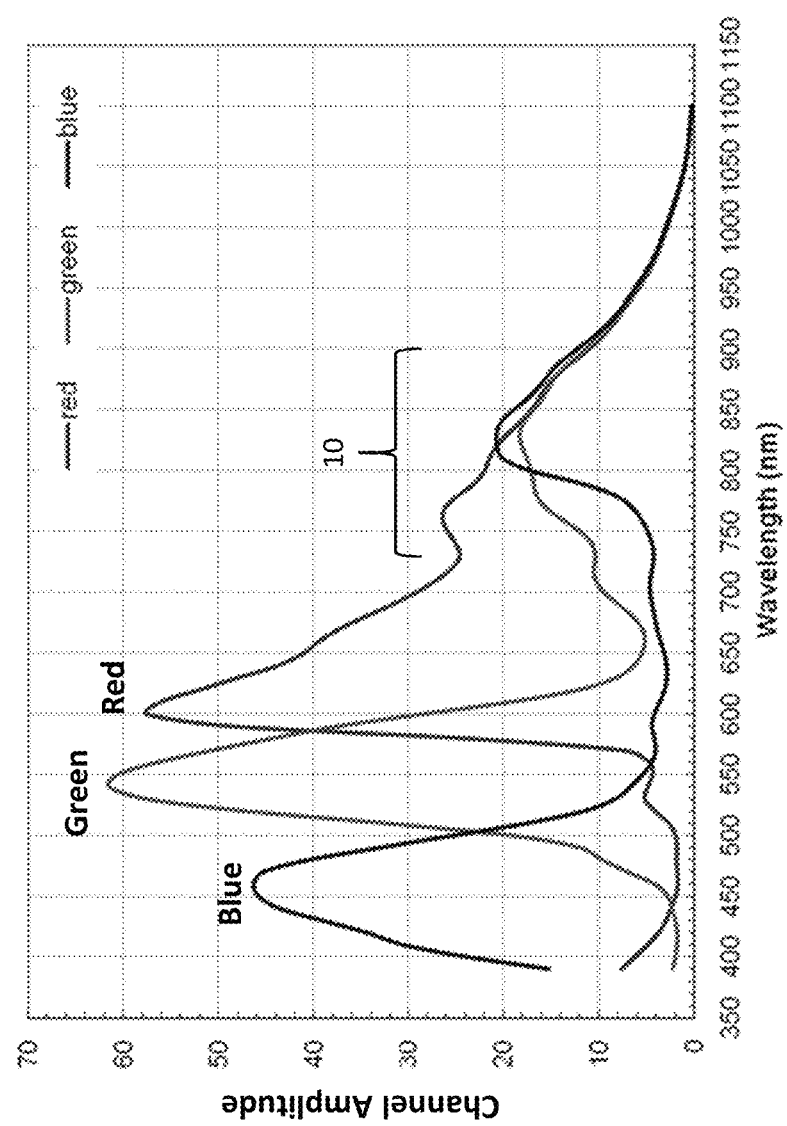
FIG. 3 shows wavelength distribution for the output channels of an RGB camera.

FIG. 3 illustrates the characteristic outputs of the red, blue and green channels of an RGB camera sensor. Wavelength range 10 represents the area of the infrared spectrum that is of interest in the particular example discussed herein.

Figure 4:
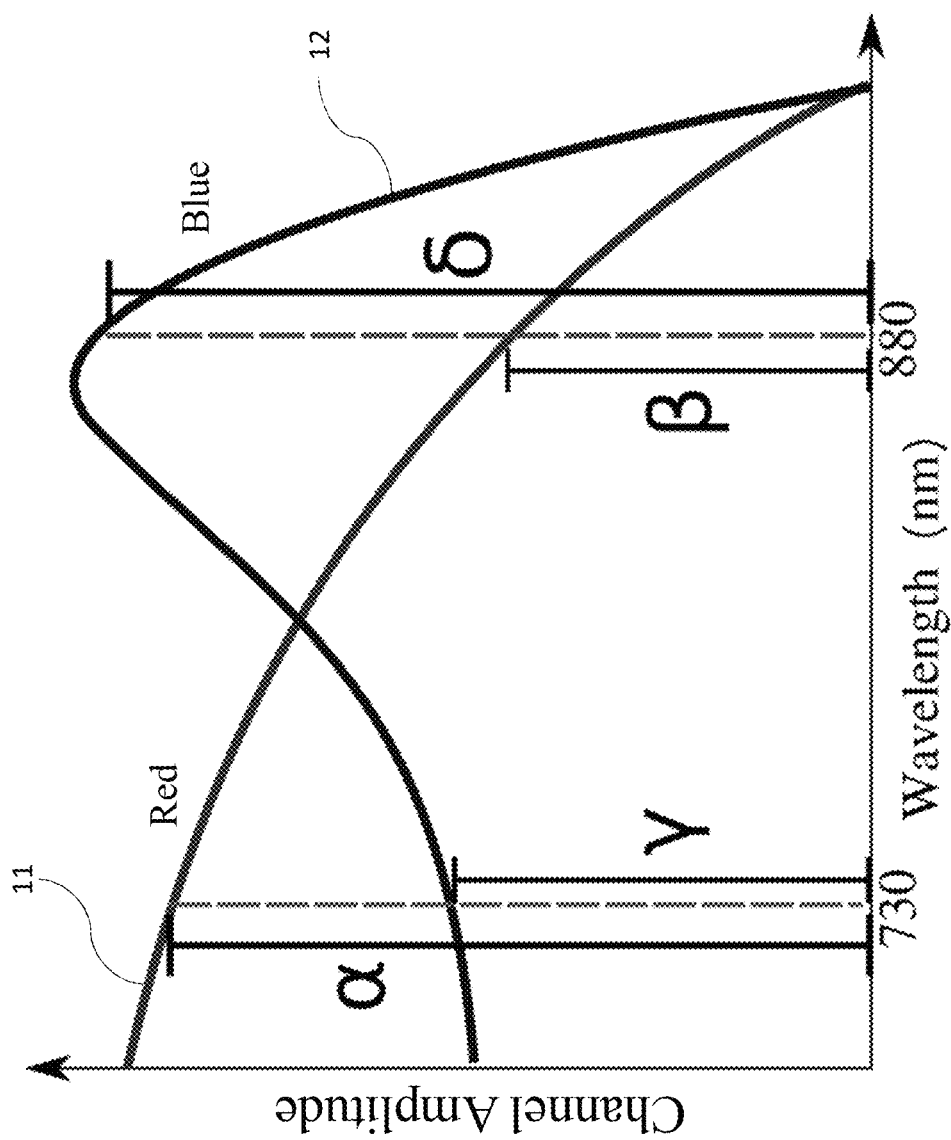
FIG. 4 shows a detail of the wavelength distribution around the infrared wavelengths of interest.

FIG. 4 shows an exploded view of the wavelength range 10 shown in FIG. 3. The banknote 6 has been simultaneously illuminated by a first LED operating at a wavelength of 730 nm, and a second LED operating at a wavelength of 880 nm.

The red channel trace 11 represents the spectral response of the red-pass filter of the Bayer filter matrix, and the blue channel trace 12 represents the spectral response of the blue-pass filter of the Bayer filter matrix.

As shown in FIG. 4, the blue and red filters respond differently at 730 nm and 880 nm respectively. The coefficients α and β represent the relative amount of light transmission by the red-pass filter at 730 nm and 880 nm respectively. Likewise, the coefficients γ and δ represent the relative amount of light transmission by the blue-pass filter at 730 nm and 880 nm respectively.

The coefficients α, β, δ and γ can be determined by a calibration process using calibration paper under separate illumination by the 730 nm LED and then the 880 nm LED. The use of calibration paper will be known to the skilled reader of the present application.

Image Extraction

To extract an image produced by the individual infrared LEDs it is necessary to quantify contributions from each LED to the red and blue filters by defining two ratios:

$$x = \frac{\gamma}{\alpha} \quad (1)$$

$$y = \frac{\delta}{\beta} \quad (2)$$

For any given sensor pixel the intensity at wavelength 730 nm is given as I(a), and the intensity at wavelength 880 nm is given as I(b). So, for each pixel under a blue-pass filter, the total light intensity, B, is given by:

$$B = \gamma I(a) + \delta I(b) \quad (3)$$

Likewise, for each pixel under a red-pass filter, the total light intensity, R, is given by:

$$R = \alpha I(a) + \beta I(b) \quad (4)$$

From equations (1), (2) and (3) we obtain:

$$B = \alpha x I(a) + \beta y I(b) \quad (5)$$

From equation (4) for we obtain:

$$\beta y I(b) = yR - \alpha y I(b) \quad (6)$$

And from equations (5) and (6) we obtain:

$$I(a) = \frac{B - yR}{\alpha(x - y)} \quad (7)$$

Similarly, we obtain:

$$I(b) = \frac{B - xR}{\beta(y - x)} \quad (8)$$

Using equations (7) and (8), the RGB control logic calculates the image data for each of the infrared LEDs, which can then be combined to produce a distinct extracted image at 730 nm and at 880 nm respectively.

Figure 5:
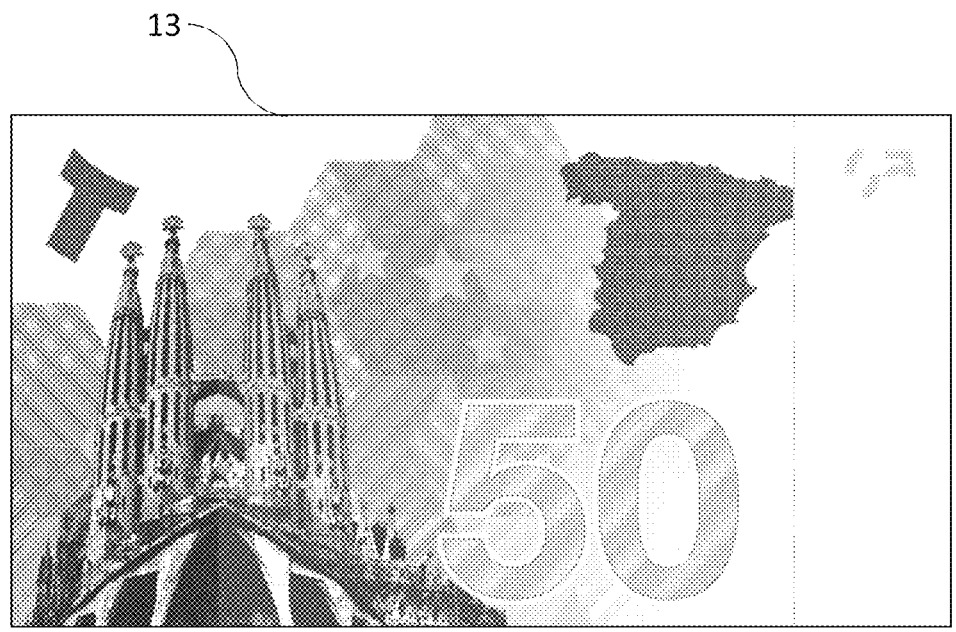
FIG. 5 is an image of a banknote in the visible region of the spectrum.
Figure 6:
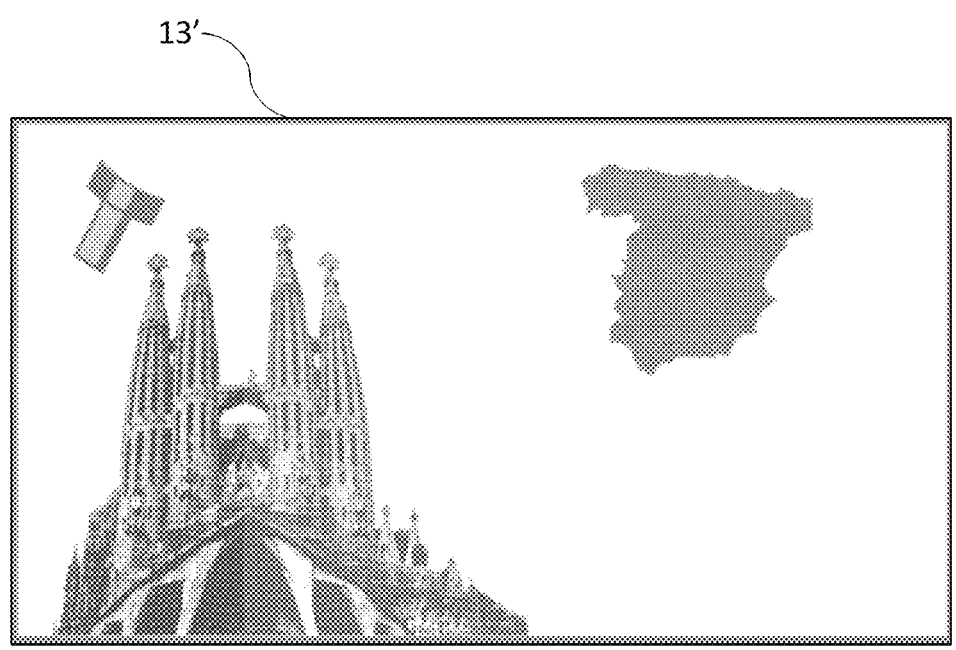
FIG. 6 is an image of the banknote in the infrared region of the spectrum.

FIG. 5 shows a banknote image 13 taken whilst illuminated by a white LED only. FIG. 6 shows an image 13' of the same banknote as shown in FIG. 5 taken whilst illuminated by the 730 nm infrared LED and the 880 nm infrared LED.

Figure 7:
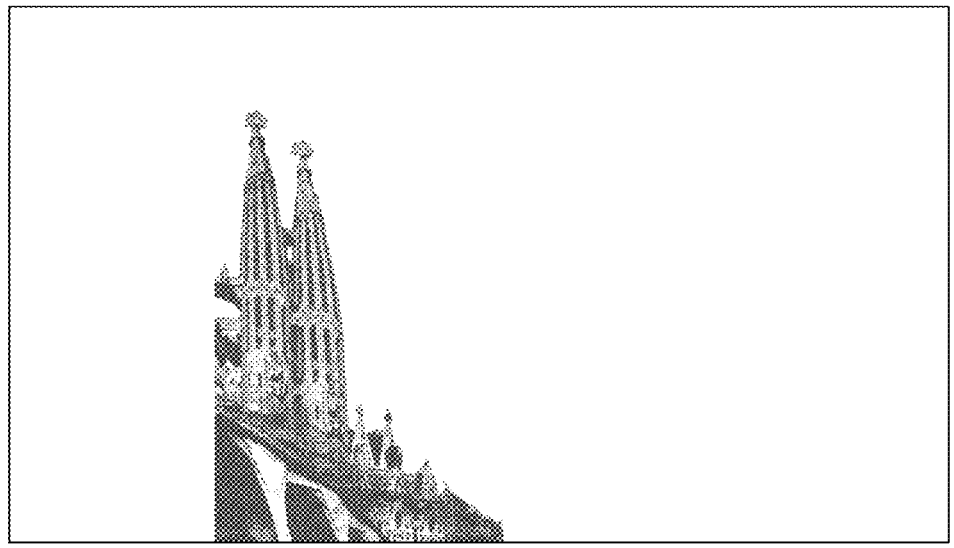
FIG. 7 is an image of the banknote at a first infrared wavelength.
Figure 8:
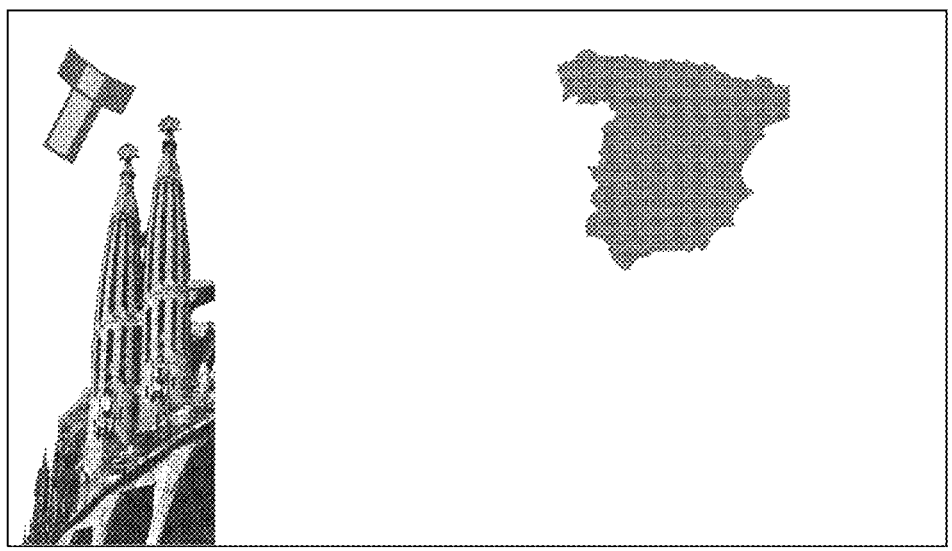
FIG. 8 is an image of the banknote at a second infrared wavelength.

FIG. 7 shows a schematic representation of an extracted image for illumination by the 730 nm LED only. FIG. 8 shows an extracted image of the same banknote. Here, the image is what would have been observed if the banknote had been illuminated by the 880 nm LED only.

In this way, two separate images of the banknote, FIGS. 7 and 8, can be extracted without the need for sequentially illuminating the banknote with the first infrared LED and then with the second infrared LED, or the need for incorporating infrared filters in the Bayer filter matrix of the RGB camera sensor.

The invention claimed is:

1. A method of obtaining a plurality of infrared images of a banknote comprising:
   simultaneously illuminating the banknote with infrared light at a first wavelength and infrared light at a second wavelength, wherein the first and second wavelengths are different, and wherein the first wavelength is between 400 nm and 1000 nm, and wherein the second wavelength is between 400 nm and 1000 nm;
   capturing an image of the banknote with an RGB camera;
   obtaining from both a first output channel signal and a second output channel signal of the RGB camera sensor an intensity distribution of the light at the first wavelength and an intensity distribution of the light at the second wavelength using a first calibration coefficient and a second calibration coefficient of the RGB camera sensor; and producing separate infrared images of the banknote at the first wavelength and the second wavelength from the respective intensity distributions;

wherein the first calibration coefficient is defined as a ratio of the first output channel signal amplitude at the light first wavelength to the second output channel signal amplitude at the light first wavelength; and wherein the second calibration coefficient is defined as a ratio of the second output channel signal amplitude at the light second wavelength to the first output channel signal amplitude at the light second wavelength; and wherein a first output channel includes a first output channel of the RGB camera sensor, and wherein a second output channel includes a second output channel of the RGB camera sensor, wherein the first and second output channels of the RGB camera sensor are different channels of the RGB camera sensor.

2. A method of claim 1, wherein the RGB camera sensor is a CMOS or CCD image sensor.

3. A method of claim 1, wherein the RGB camera sensor includes a Bayer filter matrix.

4. A method of claim 1, wherein the first wavelength is 730 nm and the second wavelength is 880 nm.

5. A method of claim 1, wherein the first and second wavelengths are emitted from a first infrared LED and a second infrared LED respectively.

\* \* \* \* \*